United States Patent [19]
Kleinebenne

[11] Patent Number: 4,846,489
[45] Date of Patent: Jul. 11, 1989

[54] PEDAL-DRIVEN VEHICLE

[75] Inventor: Dieter Kleinebenne, Bielefeld, Fed. Rep. of Germany

[73] Assignee: Ernest Kleinebenne, Leopoldshöhe, Fed. Rep. of Germany

[21] Appl. No.: 946,877

[22] Filed: Dec. 29, 1986

[30] Foreign Application Priority Data

Dec. 31, 1985 [DE] Fed. Rep. of Germany ... 8536723[U]
Jan. 25, 1986 [DE] Fed. Rep. of Germany ....... 3602199

[51] Int. Cl.$^4$ ............................................. B62M 9/00
[52] U.S. Cl. .................................... 280/261; 474/153
[58] Field of Search ................ 280/261; 474/153, 164, 474/203, 205

[56] References Cited

U.S. PATENT DOCUMENTS

| | | | |
|---|---|---|---|
| 3,260,125 | 7/1966 | Dolza | 474/153 X |
| 4,099,737 | 7/1978 | Waugh | 280/261 |
| 4,427,403 | 1/1984 | Kanamori et al. | 474/153 |
| 4,468,211 | 8/1984 | Hoshiro et al. | 474/153 X |
| 4,553,952 | 11/1985 | Tangorra et al. | 474/153 |
| 4,614,509 | 9/1986 | Tangorra et al. | 474/153 X |

*Primary Examiner*—David M. Mitchell
*Attorney, Agent, or Firm*—Ralph H. Dougherty

[57] ABSTRACT

A vehicle with a pedal drive, such as a bicycle, tricycle or moped, includes a frame. A pedal drive is rotatably mounted on the frame and includes a driving gear. A wheel is rotatably mounted on the frame and a driven gear is jointly rotatable with the wheel and includes driven gear teeth. An endless toothed belt is trained about and interconnects the driving and driven gears and includes transmission gear teeth. The driven gear teeth of the driven gear are slightly reduced with respect to driven gear teeth which would correspond to the transmission gear teeth of the endless toothed belt. The frame includes a pedal shaft bearing, a saddle tube extending upwardly and slightly rearwardly from the pedal shaft bearing, a lower frontward frame tube extending upwardly at at an inclination frontwardly from the pedal shaft bearing, a steering sleeve secured to an upper end of the lower frontward frame tube, and a connecting structure extending between the steering sleeve and the saddle tube upwardly of the lower frontward frame tube. A reinforcing beam extends between respective lower regions of the saddle tube and of the lower frontward frame tube and has a first and a second end connected to the saddle tube and to the lower frontward frame tube, respectively, by respective insertion sleeves.

6 Claims, 4 Drawing Sheets

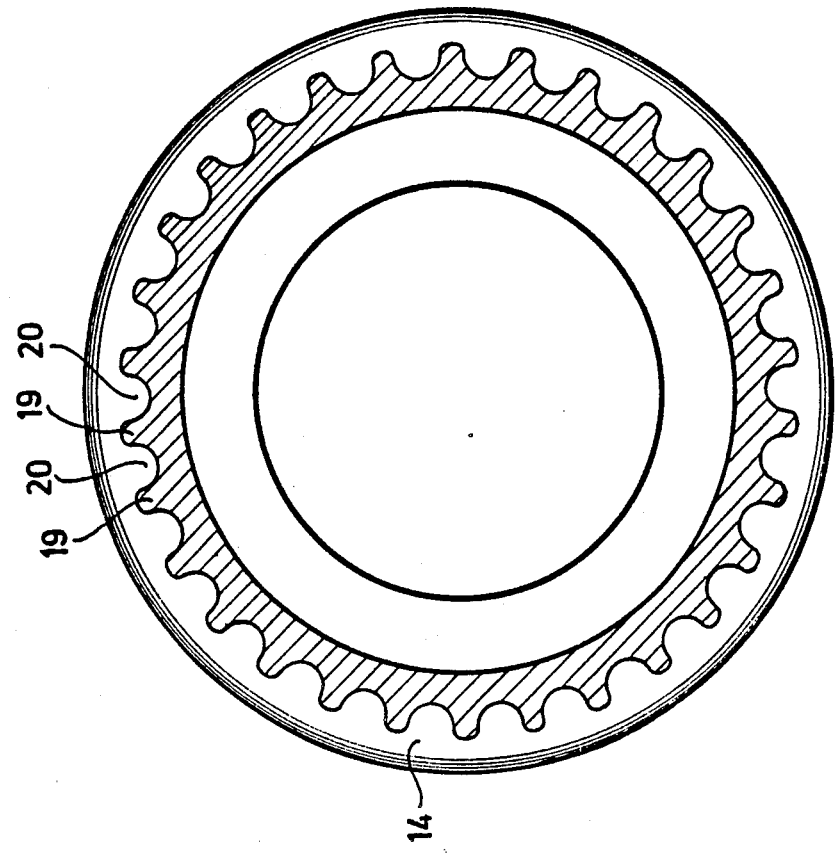
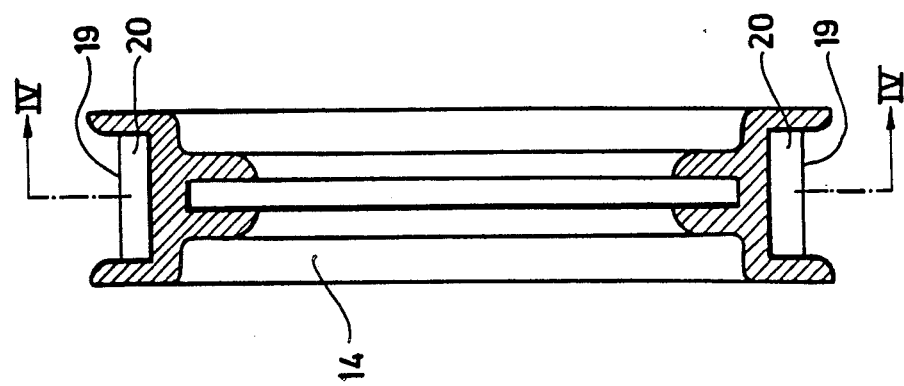

PEDAL-DRIVEN VEHICLE

BACKGROUND OF THE INVENTION

The present invention relates to vehicles in general, and more particularly to a pedal-driven vehicle.

There are already known various constructions of pedal-driven vehicle, such as bicycles, tricycles and mopeds, which usually include a frame, a plurality of wheels rotatably mounted on the frame, a pedal arrangement including a driving gear and rotatably supported in a pedal shaft bearing mounted on the frame, a driven gear mounted on the hub of one of the wheels for rotation therewith, and an elongated endless transmission element trained about and interconnecting the driving and driven gears. The frame usually includes a rearwardly arranged saddle tube which extends upwardly and slightly rearwardly from the pedal shaft bearing, a lower frontward frame tube extending inclinedly frontwardly from the pedal shaft bearing, a steering sleeve mounted on the upper region of the lower frontward frame tube, and a connecting structure which is arranged above the lower frontward frame tube at a distance therefrom and interconnecting the steering sleeve with the saddle tube.

In such pedal-driven vehicles, such as bicycles, there is usually used a chain transmission for transmitting the driving force exerted by the bicycle rider from the pedals to the rear wheel. Such chain transmissions initially have an efficiency of about 95%. However, this efficiency soon decreases, due to insufficient lubrication and as a result of wear to about 70%. The chain requires a certain degree of maintenance during its use; more particularly, it must always be well lubricated. As a result of this, the chain always constitutes a cause of soiling for the bicycle rider, which is especially disadvantageous if the chain has slid off from one or both of the gears and must be manually placed on the driving and driven gears. However, even during the normal operation of the bicycle, the legs or trousers of the bicycle rider may become soiled by the chain lubricant.

To the extent that the pedal drive of such pedal-driven vehicles includes a toothed belt instead of a chain, there exists the disadvantage that, when strongly pulsating tensional forces are encountered in the toothed belt, such as during the start-up or the braking operation, there may occur a so-called treading through or jumping over of the toothed belt. During this operation, there occurs withdrawal of the teeth of the toothed belt from the spaces between the teeth of the driven gear during vigorous pedaling. Herein, the teeth of the toothed belt ultimately reach the crests of the teeth of the driven gear and then slide over such crests and fall into the spaces between the respectively following teeth of the driven gear. Thus, there occurs an operation which is reminiscent of slippage.

An increase in the width of the toothed belt and of the gears is not of any interest for space reasons, inasmuch as a drive which is as thin as possible is desired in bicycles. Even the use of a pressing roller which engages the toothed belt from the outside at the input region to the driven gear, as it is shown in the U.S. Pat. No. 4,099,737, does not bring about satisfactory results.

Moreover, if the connecting structure extends from the steering sleeve to the lower region of the saddle tube, as it does in the so-called ladies' bicycles, so that the frame has a substantially V-shaped configuration at its region located between and underneath the saddle and the handlebars so as to present upwardly of the pedal drive a mounting space which is not present in the so-called men's bicycle having a horizontal upper bar extending between the steering sleeve and the upper region of the saddle tube, the stiffness of the frame is rather low, so that it can be relatively easily deformed.

SUMMARY OF THE INVENTION

Accordingly, it is a general object of the present invention to avoid the disadvantages of the prior art.

More particularly, it is an object of the present invention to provide a pedal-driven vehicle which does not possess the drawbacks of the known vehicles of this type.

Still another object of the present invention is to devise a vehicle of the type here under consideration which has a relatively high efficiency and possesses a relatively high operating safety of the transmission.

It is yet another object of the present invention to reinforce the frame of the vehicle when constructed as a ladies' bicycle.

An additional object of the present invention is to design the above bicycle in such a manner that it can be easily gripped, carried and otherwise handled before or after riding the same.

A yet further object of the present invention is to develop a bicycle which has a frame of improved stiffness so as to capture and suppress even lateral oscillations.

A concomitant object of the present invention is so to construct the vehicle of the above type as to be relatively simple in construction, inexpensive to manufacture, easy to use, and yet reliable in operation.

In keeping with these objects and others which will become apparent hereafter, one feature of the present invention resides in a vehicle with a pedal drive, such as a bicycle, tricycle or moped, which comprises a frame; a pedal drive rotatably mounted on the frame and including a driving gear; a wheel rotatably mounted on the frame; a driven gear jointly rotatable with the wheel and including driven gear teeth; and an endless toothed belt trained about and interconnecting the driving and driven gears and including transmission gear teeth, the driven gear teeth of the driven gear being slightly reduced with respect to those corresponding to the transmission gear teeth of the endless toothed belt.

Thus, during the manufacture of the driven gear, the material-removing tool is, for instance, so adjusted that merely the respective diameters of the toothing of the driven gear are slightly reduced relative to those which would normally correspond to the tooth profile of the toothed belt and which are also provided at the driving gear, whereas the type of the toothing is not changed in any other respects.

During this reduction, there is preferably performed a uniform relative reduction of the outside circle diameter, as well as of the root circle diameter and the of nominal diameter of the driven gear teething of the driven gear. This reduction of the diameters in question of the driven gear while maintaining the same shape of the teeth achieved in a toothed belt drive the surprising result that the teeth of the toothed belt no longer climb out of the spaces between the teeth of the driven gear. The shape and diameters of the teeth of the larger driving gear which is arranged at the pedal drive is maintained unchanged and corresponds to the tooth profile of the toothed belt.

Advantageously, the extent of relative reduction of the outside circle diameter, of the root circle diameter and of the nominal diameter of the driven gear teething of the driven gear amounts to approximately 1% in each instance, in order to achieve the desired result of disturbance-free operation of the drive and transmisson.

In a bicycle having usual dimensions, the reduction of the diameters has the result that the distance of one of the spaces between the gear teeth of the driven gear from the next following one is smaller by about 0.1 mm than otherwise. As a result, even the space for the accommodation of the tooth of the toothed belt between the two consecutive gear teeth of the driven gear becomes correspondingly smaller, so that there results a different position of the tooth of the toothed belt in the space between the gear teeth of the driven gear. Concurrently with the distance between any two consecutive tooth spaces, the distance between the two consecutive gear tooth crests of the driven gear is changed in a corresponding manner as well.

Inasmuch as the conditions encountered in a bicycle which includes a larger driving gear and a smaller driven gear when utilizing a chain transmisson are exactly opposite to those employed in conventional toothed belt drives used in machine construction, where the driving gear has a smaller diameter and the driven gear has a larger diameter, the use of the toothed gear according to the present invention for the powering of a bicycle was not close at hand.

It is further advantageous when each space between respective adjacent gear teeth is delimited by a bottom surface extending along a circular arc. The endless toothed belt is advantageously of a rubber-elastic material with an embedded textile fabric. When a toothed belt of this type is being used in the arrangement of the present invention, there is obtained an absolute freedom from by any need for maintenance. The toothed belt of this construction does not become extended, as a chain would. The wear of the belt is hardly meansurable. Moreover, above.all, the toothed belt need not be lubricated, so that the above-mentioned danger of soiling is avoided. The toothed belt can be handled easily, in the same manner as a chain, during the positioning thereof on the driving and driven gears.

According to another concept of the present invention, there is provided a pedal drive for a vehicle, such as a bicycle or a tricycle, which includes a frame and a wheel rotatably mounted on the frame, comprising a pedal arrangement rotatably mounted on the frame and including a driving gear; a driven gear jointly rotatable with the wheel and including driven gear teeth; and an endless toothed belt trained about and interconnecting the driving and driven gears and including transmission gear teeth, the driven gear teeth of the driven gear being slightly reduced with respect to driven gear teeth which would correspond to the transmission gear teeth of the endless toothed belt.

Another advantageous aspect of the present invention is to be found in a bicycle comprising a frame including a pedal shaft bearing, a saddle tube extending upwardly and slightly rearwardly from the pedal shaft bearing, a lower frontward frame tube extending upwardly at an inclination frontwardly from the pedal shaft bearing, a steering sleeve secured to an upper end of the lower frontward frame tube, and a connecting structure extending between the steering sleeve and the saddle tube upwardly of the lower frontward frame tube; and a reinforcing beam extending between respective lower regions of the saddle tube and of the lower frontward frame tube and having a first and a second end connected to the saddle tube and to the lower frontward frame tube, respectively. Such a construction need not be considered to be a decidedly ladies' bicycle; rather, it can be considered, because of the elimination of the horizontal upper tube or bar, generally as a bicycle for senior citizens which offers to the users a convenient and comfortable mounting and dismounting.

A particularly advantageous construction is obtained when there is employed connecting means that includes first and second insertion sleeves connecting the first and second ends of the reinforcing beam to the saddle tube and to the lower frontward frame tube, respectively. The connecting means advantageously further includes at least one permanent connection between each of the insertion sleeves and at least one of the reinforcing beam, saddle tube, and the lower frontward frame tube, such as a welded connection, a soldered connection, or a glued connection. It is advantageous when the connecting structure extends between the steering sleeve and a location of the saddle tube which is situated between the pedal shaft bearing and that of the insertion sleeves which is mounted on the saddle tube.

It is currently preferred for the connecting structure to include two inclined parallel upper frontward frame tubes which extend are situated at opposite lateral sides of and are connected to the reinforcing beam and the saddle tube. These upper frame tubes may have diameters which are smaller than those of the remaining frame tubes. They form with the lower frame tube, the steering sleeve and a part of the saddle tube a rectangular, trapezoidal or parallelogram construction. Inasmuch as each of the upper frame tubes, like the lower frame tube, has three connection points, there result, in conjunction with the reinforcing beam and the saddle tube, a frame construction which has a particularly high stability.

It is especially advantageous when the reinforcing beam includes two straight sections which are arranged at an obtuse angle with respect to one another and one of which is substantially horizontal to serve as a handgrip and is situated between the saddle tube and the upper frontward frame tubes. Because of this construction, the bicycle can be very easily maneuvered in that, for instance, the left hand of the bicycle user engages the handlebars and the right hand grips the handgrip when the bicycle is to be carried. The handgrip section of the reinforcing beam is arranged at the center of gravity of the bicycle as a whole, so that any moments which occur during the gripping and lifting of the bicycle compensate for one another.

BRIEF DESCRIPTION OF THE DRAWING

The present invention will be described below in more detail with reference to the accompanying drawing in which:

FIG. 3 is an axial section through a gear section of a driven gear of the bicycle;

FIG. 4 is a radial section through the gear section taken on line IV—IV of FIG. 3;

DETAILED DESCRIPTION OF THE PREFERRED EMBODIMENT

Figure 1:
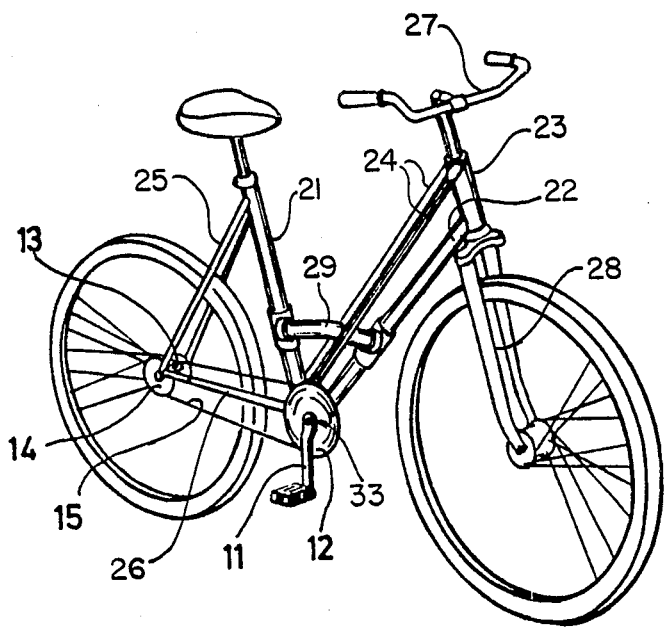
FIG. 1 is a perspective view of a bicycle embodying the present invention.
Figure 2:
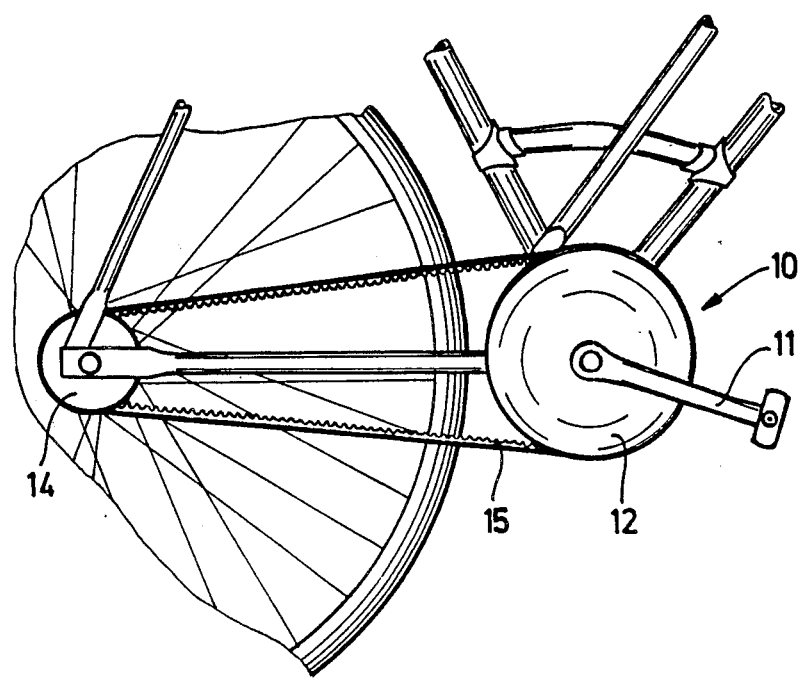
FIG. 2 is a side elevational view of the pedal drive of the present invention.
Figure 5:
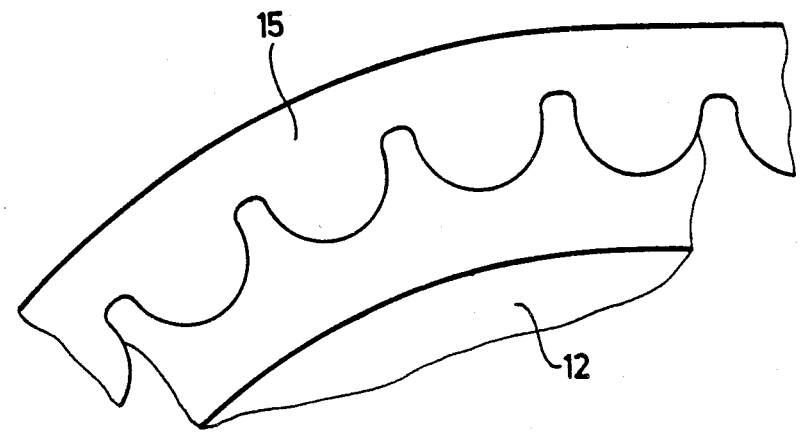
FIG. 5 is a side elevational view diagrammatically illustrating the cooperation of the toothed belt with the driving gear.
Figure 6:
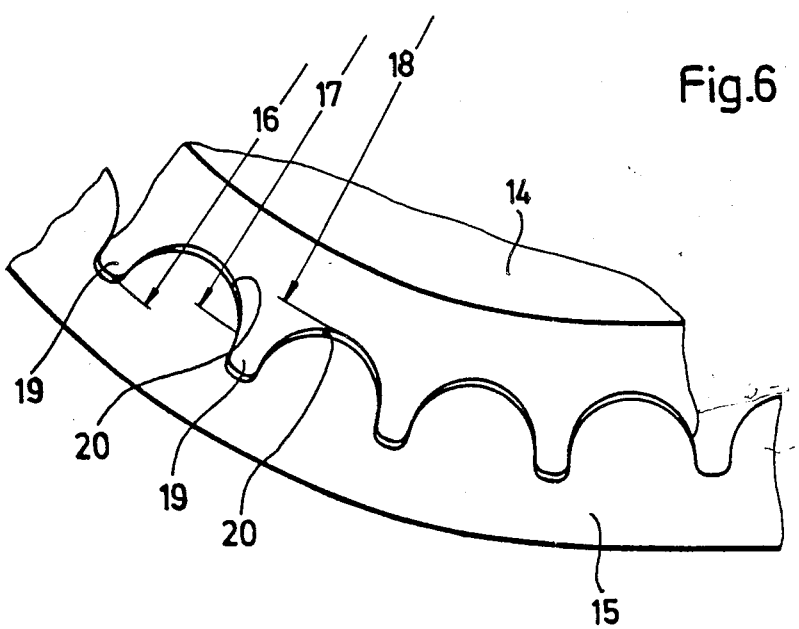
FIG. 6 is a side elevational view diagrammatically illustrating the cooperation of the toothed belt with the driven gear.

Referring now to the drawing in detail, and first to FIG. 1 thereof, it may be seen that it depicts a bicycle of the type which is commonly referred to as a ladies' bicycle. As shown particularly in FIGS. 1 and 2 of the drawing, the reference numeral 10 has been used to identify a pedal drive. The pedal drive 10 includes, as customary, two pedal components 11 of which by only one has been shown for the sake of simplicity. The pedal components 11 are connected to a driving gear 12 which constitutes another componet of the pedal drive 10. A driven gear 14 is rotatably mounted on a rear wheel hub of the bicycle and is connected with the driving gear 12 by a toothed belt 15. In this pedal drive 10, as in the conventional bicycle chain drive, the diameter of the driving gear 12 is larger than that of the driven gear 14. The toothed belt 15, which is trained in a tensioned manner about the driving and driven gears 12 and 14, corresponds to the conventional bicycle chain. The toothed belt is made of a rubber-elastic material with an embedded textile fabric, in a manner similar to a conventional V-belt.

While the toothing of the driving gear 12 exactly corresponds to the toothing of the toothed belt 15, the toothing of the driven gear 14 is, in accordance with the present invention, somewhat modified. As may be ascertained by considering FIGS. 3 to 6 of the drawing in conjunction with one another, this modification of the toothing of the driven gear 14 is the result of making the outside circle diameter 16 of each tooth 19, as well as the root circle diameter 18 of each tooth space 20 and the nominal diameter 17 of the toothing of the driven gear 14 smaller by about 1% than those corresponding to the toothing of the toothed belt 15. As result of this, there is obtained a disposition of the toothed belt 15 on the driven gear 14 which is different from that of the toothed belt 15 on the driving gear 12. The teeth of the toothed belt 15 are received in the tooth spaces 20 of the driven gear 14 differently in that intermediate spaces are maintained between said driven gear and said tooth belt at least in regions substantially tangential to outer surfaces of both said driven gear teeth and said transmission gear teeth, while contact is maintained between respective sides of said driven gear teeth and said transmission gear teeth. Now, numerous experiments have shown that, when providing this arrangement, climbing out of the teeth of the toothed belt 15 from the tooth spaces 20 of the driven gear 14 does not occur even when strongly pulsating forces are encountered in the toothed belt 15. Therefore, the tooth belt drive constructed in accordance with the present invention is particularly suited for operation of the bicycle with strongly pulsating tension forces in the toothed belt 15 as they occur as a result of timewise changing treading on the pedal drive 10 and especially during start-up and braking operation of the bicycle.

Turning now again to FIG. 1 of the drawing, it may be seen, in conjunction with FIG. 3, that a ladies' bicycle depicted therein includes a frame consisting of a saddle tube 21 which extends upwardly and slightly rearwardly from a pedal shaft bearing 33, a lower frontward frame tube 22 which also extends upwardly from the pedal shaft bearing 33 and is inclined frontwardly, a steering sleeve 23 which is secured to the upper end of the lower frontward frame tube 22, two mutually parallel upper frontward frame tubes 24 having upper ends which are also connected to the steering sleeve 23, upper rear wheel struts 25, and lower rear wheel struts 26. In the steering sleeve 23, there is turnably received a steering rod which carries steering handlebars 27 at its upper end and a front wheel fork 28 at its lower end.

Figure 7:
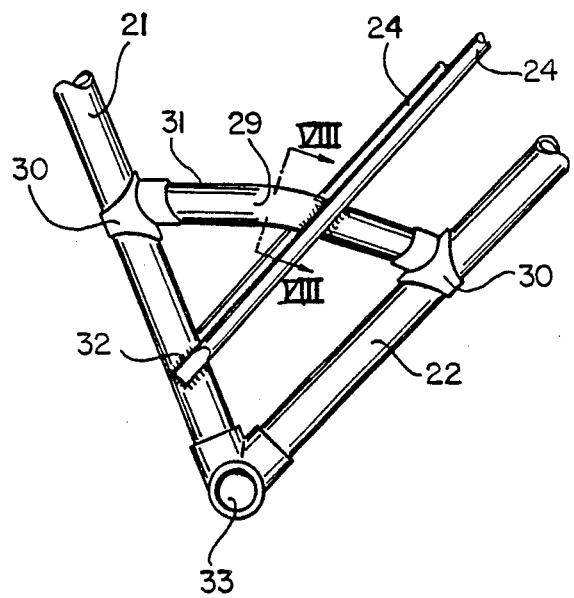
FIG. 7 is an enlarged perspective view of the lower central region of the bicycle frame including a reinforcing beam in accordance with the present invention.

As shown particularly in FIG. 7 of the drawing, the saddle tube 21 and the lower frontward frame tube 22, which constitute components of the frame and which extend relative to one another in such a manner as to form a V-shaped configuration, are connected with one another at their lower regions at the vicinity of the pedal shaft bearing 33 by a reinforcing beam 29. The reinforcing beam 29 consists of two straight sections which enclose an obtuse angle with one another. The frontward one of these straight sections of the reinforcing beam 29 borders on the lower frontward frame tube 22 and is connected to the latter by an insertion sleeve 30. The insertion sleeve 30 may be connected to the lower frontward frame tube 22 by welding, soldering or gluing. The rearward section of the reinforcing beam 29 constitutes a horizontally arranged handgrip 31. The handgrip 31 is situated substantially at the center of gravity of the bicycle. The reinforcing beam 29 is connected to the saddle tube 21 at a rearward end of the handgrip 31 by another insertion sleeve 30. The connections of the handgrip 31 and of the saddle tube 21 with the insertion sleeve 30 can be accomplished by welding, soldering or gluing.

Figure 8:
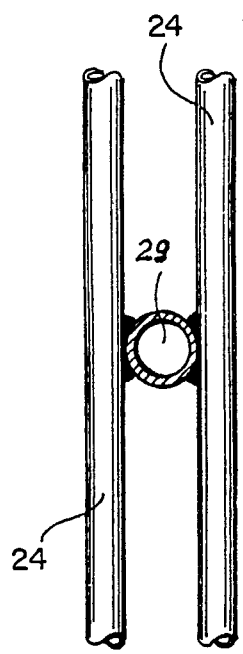
FIG. 8 is a partially sectioned view taken on line VIII—VIII of FIG. 7.

The two parallel, inclinedly arranged upper frontward frame tubes 24 serve for further reinforcement of the frame. As also indicated in FIG. 7 of the drawing, the upper frontward frame tubes 24 are connected at their lower ends with the saddle tube 21 in such a manner that the lower ends thereof are arranged at opposite lateral sides of the saddle tube 21. The connection of the upper frontward frame tubes with the saddle tube may be accomplished by welding or soldering. Herein, a connecting location 32 at which the respective lower end of the upper frontward frame tube 24 is connected to the saddle tube 21 is situated in each instance between the pedal shaft bearing 33 and the insertion sleeve 30 of the handgrip 31. As a comparison of FIGS. 7 and 8 with one another will reveal, the reinforcing beam 29 passes between the two upper frontward frame tubes 24. Welded or soldered connections are provided as well at the juxtaposed regions of the reinforcing beam 29 and the two upper frontward frame tubes 24.

The provision of the reinforcing beam 29 contributes to the increase in the stability of the bicycle frame. The reinforcing beam 29 constitutes, together with the lower regions of the saddle tube 21 and of the lower frontward frame tube 22, approximately a triangle. As a result of the provision of the connecting locations, which are situated at the corners of such an imaginary triangle, that is, as a result of the provision of the pedal shaft bearing 33 which is situated at the lowermost location of this imaginary triangle, and of the insertion sleeves 30 which are arranged upwardly therefrom, as well as a result of the connections of the upper frontward frame tubes 24 to the saddle tube 21 and to the reinforcing beam 29, the stiffness of the bicycle frame as a whole is so high that, even if this ladies' bicycle is to be used as a men's bicycle, the customarily provided upper horizontal frame tube can be dispensed with without encountering any problems.

While the present invention has been described and illustrated herein as embodied in a specific construction of a ladies' bicycle, it is not limited to the details of this particular construction, since various modifications and structural changes are possible and contemplated by the present invention. Thus, the scope of the present invention will be determined exclusively by the appended claims.

What is claimed is:

1. A vehicle with a pedal drive, comprising:

a frame, said pedal drive being rotatably mounted on said frame and including a driving gear;

a wheel rotatably mounted on said frame;

a driven gear jointly rotatable with said wheel, and including driven gear teeth, tooth spaces being formed between respective of said gear teeth, said driven gear defining an outside circle tangential to each of said teeth, a root circle for each of said tooth spaces, and a nominal diameter of the toothing of said driven gear;

an endless elastic toothed belt trained about and interconnecting in a tensioned manner said driving and driven gears, and including transmission gear teeth, and spaces between said transmission gear teeth for receiving said driven gear teeth, a root circle defining the root of the spaces between said transmission gear teeth, an inside circle tangential to each of said transmission gear teeth and a nominal diameter of the transmission gear toothing, the root circle for said driven gear corresponding generally to the inside circle of said endless elastic toothed belt, the outside circle for said driven gear teeth corresponding generally to the root circle of the spaces between the transmission gear teeth, and the nominal diameter of each generally corresponding to that of the other;

the diameters of said driven gear being smaller by about 1% with respect to the corresponding diameters of said endless elastic toothed belt; so that when said endless elastic toothed belt is trained about said driven gear, intermediate spaces are maintained between said driven gear and said endless elastic toothed belt at least between the outside circle of said driven gear teeth and the root circle of said transmission gear teeth of said endless elastic toothed belt, while contact is made between respective sides of said driven gear teeth and said transmission gear teeth.

2. The vehicle as defined in claim 1, wherein each space between respective adjacent gear teeth is delimited by a bottom surface extending along a circular arc.

3. The vehicle as defined in claim 1, wherein said endless elastic toothed belt is of a rubber-elastic material with an embedded textile fabric.

4. A pedal drive for a vehicle, wherein the vehicle includes a frame and a wheel rotatably mounted on said frame, comprising:

a pedal arrangement rotatably mounted on the frame, and including a driving gear;

a driven gear jointly rotatable with said wheel, and including driven gear teeth, tooth spaces being formed between respective of said gear teeth, said driven gear defining an outside circle tangential to each of said teeth, a root circle for each of said tooth spaces, and a nominal diameter of the toothing of said driven gear;

an endless elastic toothed belt trained about and interconnecting in a tensioned manner said driving and driven gears, and including transmission gear teeth, and spaces between said transmission gear teeth for receiving said driven gear teeth, a root circle defining the root of the spaces between said transmission gear teeth, an inside circle tangential to each of said transmission gear teeth and a nominal diameter of the transmission gear toothing, the root circle for said driven gear corresponding generally to the inside circle of said endless elastic toothed belt, the outside circle for said driven gear teeth corresponding generally to the root circle of the spaces between the transmission gear teeth, and the nominal diameter of each generally corresponding to that of the other;

the diameters of said driven gear being smaller by about 1% with respect to the corresponding diameters of said endless elastic toothed belt; so that when said endless elastic toothed belt is trained about said driven gear, intermediate spaces are maintained between said driven gear and said endless elastic toothed belt at least between the outside circle of said driven gear teeth and the root circle of said transmission gear teeth of said endless elastic toothed belt, while contact is made between respective sides of said driven gear teeth and said transmission gear teeth.

5. The pedal drive as defined in claim 1, wherein each space between respective adjacent gear teeth is delimited by a bottom surface extending along a circular arc.

6. The pedal drive as defined in claim 4, wherein said endless toothed belt is of a rubber-elastic material with an embedded textile fabric.

* * * * *